March 15, 1960   E. S. THALL ET AL   2,928,925
GETTER STRUCTURE
Filed Aug. 15, 1956
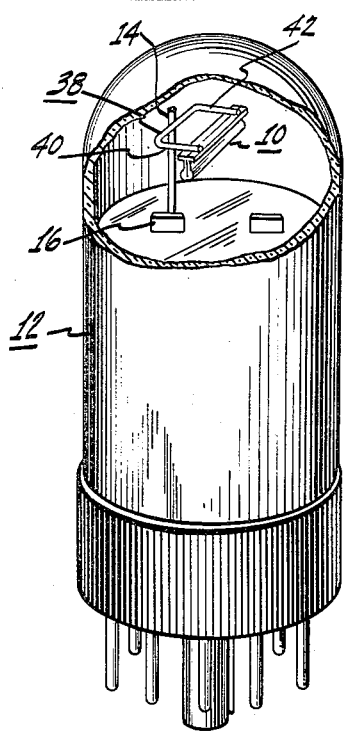
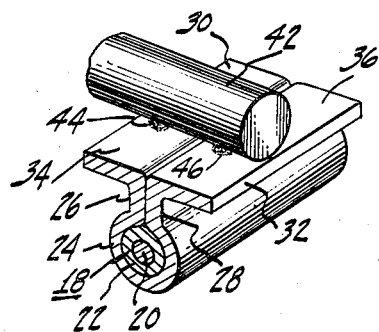
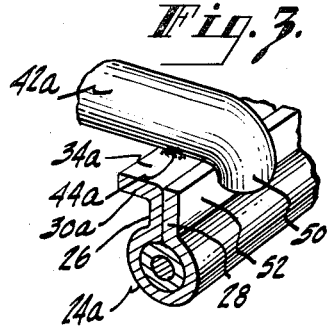
INVENTORS
EARLE S. THALL &
HENRY J. MILLER
BY
William A. Zaleske
ATTORNEY United States Patent Office 2,928,925
Patented Mar. 15, 1960

2,928,925

GETTER STRUCTURE

Earle S. Thall, West Orange, and Henry J. Miller, South Orange, N.J., assignors to Radio Corporation of America, a corporation of Delaware Application August 15, 1956, Serial No. 604,277

6 Claims. (Cl. 219—19)

This invention relates to a getter structure adapted to be used within an electron discharge device. Specifically, the invention concerns an improved flashable getter adapted to be welded to a support therefor without prematurely flashing the getter.

Flashable getter materials are used as clean-up agents within electron discharge devices such as electron tubes during the usual evacuation of envelopes thereof. The getter material is heated until it volatilizes in what is known as a getter flash, depositing getter material on a surface within the tube.

Such getter materials are usually enclosed in a protective container, the container being secured to a support which, together with the container, forms an inductive electrical energy pick-up loop for flashing and thus activating the getter material, the support being in turn fixed to a portion of an electrode structure within an electron tube. A problem arises in the manufacture of a getter comprising the getter material, container, and support therefor. Since for manufacturing convenience the container is filled with the getter material prior to a welding of the container to the support, heat developed during the welding may prematurely activate at least a portion of the getter material, thereby reducing the amount of getter material available for gettering a tube envelope in which the getter is ultimately used. When the getter is secured to the support by means other than welding the joint between the container and support often has poor mechanical rigidity and a high electrical resistivity so that the joint provides a poor electrical path for electric current used for the activation of the getter material.

It is an object of the invention to provide a relatively rugged getter structure which is characterized by its simplicity of manufacture and economy.

Another object of the invention is the provision of a getter structure which includes a flashable getter element and which is readily weldable to a support without danger of premature activation of the element.

It is a further object of the invention to provide an improved getter structure of the type which has a flashable getter material within a container secured to a support and a welded container-to-support joint, and which lends itself to increased manufacturing economy.

The foregoing and related objects are realized in a getter comprising an elongated flashable getter element enclosed within an elongated container. The container has a longitudinal extent which is substantially the same as that of the getter element and has an integral flange spaced from the element. A flat surface portion of the flange is adapted to be welded to a support for the container. Since the flange is spaced from the active element, a welding of the flange to the support may be effected without an attendant danger of heating the element to its activation temperature during the welding operation. A relatively rugged getter, which is especially suited to mass production techniques, is provided since the flange is integral with the container, the container and flashable getter elements are coextensive, and the container and its support are fixed by a welded joint.

According to one feature of the invention the flange, like the container, also has a longitudinal extent which is substantially the same as that of the active getter element. Consequently, this structure lends itself to production by the relatively simple and low cost technique wherein a continuous length of getter element stock is inserted into a continuous length of container stock to form a continuous length of getter structure stock. This getter structure stock is then cut off to desired lengths, as by a pinching-off operation, to form completed getter structure units each comprised of coextensive element and container parts.

According to still another feature of the invention there is provided, between the container and its flange, a pair of closely adjacent walls integral with the container. The walls serve not only to space the active getter element even farther from the flange, but also to provide a pair of flash directing members which serve to better control the direction of the flash.

In the drawing, wherein like numerals refer to like parts:

Fig. 1 is a partially cut-away perspective view of an electron tube embodying a getter structure of the invention;

Fig. 2 is an enlarged fragmentary view of a portion of the getter structure shown in Fig. 1; and Fig. 3 is a fragmentary view of a portion of a getter structure according to another form of the invention.

Referring now to the drawing in greater detail, there is shown in Figs. 1 and 2 a getter structure 10 adapted to be used within an electron tube 12. The getter structure is fixed, by means of a stiff length of wire 14, to an end of a cage or electrode assembly 16 within the tube.

The getter structure 10 (Fig. 2) includes an elongated flashable getter element 18 such, for example, as a barium wire 20 encased in a tubular sheath 22 of aluminum. The aluminum sheath 22 serves to protect the wire 20 from reacting with the ordinary atmosphere during the manufacture of the getter structure but reacts exothermically with the barium wire during the activation of the getter. The getter element 18 is disposed within a container 24 which has a longitudinal extent substantially the same as that of the element 18. A pair of closely adjacent walls 26 and 28, integral with the container 24, extend transversely of the container and terminate in a pair of flanges 30 and 32 extending from the walls in a plane generally at a right angle to the planes of the walls. The integral container, walls, and flanges define a structure having a generally omega-shaped ($\Omega$) cross-section (the omega-shape being up-side down in the getter structure illustrated in Figs. 1 and 2) with the flanges 30 and 32 forming the feet of the omega-shaped structure. The flanges 30 and 32 each have a flat flange surface portion, 34 and 36 respectively, adapted to be welded to a U-shaped support 38 (Figs. 1 and 2) lying in a plane generally parallel to the plane of the flanges. The support fixes the container 24 and the getter element 18 therein to the electrode assembly 16. The U-shaped support 38 and container 24 form an inductive electric current receiving member, such as a radio frequency pick-up loop, adapted to receive induced electric current for the activation of the getter element 18. The U-shaped member 38 includes a pair of legs 40 and 42 which are each welded to spaced-apart areas along the flange portions. For example, the leg 42 in Fig. 2 is welded at welds 44 and 46 to flange portions 34 and 36, respectively. Such welds maintain the portions of the container 24 adjacent to the support legs 40 and 42 closed during the activation flash of the getter element 18 so that the substantially entire getter flash is directed through the portion of the getter structure between the walls 26 and 28 and between the legs 40 and 42.

Since the weld portions 44 and 46 are spaced from the getter element 18 by virtue of being welded to the flanges 30 and 32, and even further spaced from the element by virtue of the walls 26 and 28, the getter element 18 is not heated to its activation temperature during a normal welding of the support 38 to the flanges 30 and 32. Consequently, the getter structure described lends itself to production by a relatively simple and low cost technique. According to this technique, a continuous length of getter element stock of circular cross-section, which for example may be a reel of such stock (not shown), is positioned against a continuous length of flat, ribbon-like container stock, as for example a reel of such stock (not shown), so that when the stock is shaped into the Ω-shape cross-section described the getter element stock is enclosed by the shaped container stock. For accomplishing such shaping the outer edges of the flat ribbon-like container stock are gradually bent around the circular cross-section getter element stock, using the element stock as a mandrel for the ribbon stock (as by forming the container stock by a series of pairs of closely spaced rollers, with successive pairs spaced closer together) until a central portion of the container stock envelopes the element stock. At the same time, portions of the container stock adjacent to the edges thereof are formed into the walls and flanges aforementioned. The continuous length of getter structure stock thus formed may then be subjected to a series of welding operations wherein U-shaped getter supports of the type shown in Figs. 1 and 2 are welded to spaced-apart portions of the feet or flanges of the getter structure stock. The portions of the stock between adjacent supports are then cut, as by a pinching-off operation, to separate the getter structure units into structures each comprised of coextensive element and container parts.

As shown in Fig. 3, the getter structure of the invention may take the form wherein the getter element container 24a has a pair of integral walls 26 and 28, as is the case in the container 24 of Figs. 1 and 2, but has a single flange 30a. In such a case the generally U-shaped support, of which one leg 40a is shown, has the two legs thereof welded to spaced-apart area of a flat surface portion 34a of the flange with a portion of each leg spaced from the end thereof welded to the flange surface portion, as at weld 44a. The end portion 50 of the leg 42 extends across the end of the wall 28 which does not have a flange and is bent into contact with a surface portion 52 of this wall 28. The bent-over end portion 50 of the support leg 40a maintains together the walls at each end of the getter structure adjacent to a support leg during the activation flash of the getter so that, as in the structure of Figs. 1 and 2, the getter flash is confied to the region of the structure between the walls 26 and 28 and between the two legs of the U-shaped support.

From the foregoing it will be appreciated that the invention provides at rugged getter structure of the flashable getter type which may be manufactured by low cost mass production techniques.

What is claimed is:

1. A getter comprising an elongated aluminum-clad barium element, a container within which said element is disposed and having a longitudinal extent substantially the same as that of said element, the ends of said container being pinched for protecting said element from the ambient temperature, said container having a pair of integral flanges each maintained in spaced relation with respect to said getter element by a pair of closely adjacent wall members, each of said flanges and wall members extending for substantially only the entire length of said element and a support extending across said flanges and welded thereto, whereby said wall members are restrained from separation adjacent to said support, said wall members being free to separate at regions thereof spaced from said support and in response to the activation flash of said getter element for controlling the direction of said flash.

2. The getter claimed in claim 1 and wherein said support comprises a substantially U-shaped structure welded at each of the legs thereof to spaced apart areas of said flange surface portion, whereby said container, wall members, flanges, and element are adapted, together with said support, to provide a radio frequency energy pick-up structure for receiving energy for activating said element.

3. A getter comprising an elongated flashable getter element, a substantially tubular container around said element and having a longitudinal extent substantially the same as that of said element, the ends of said container being pinched for protecting said element from the ambient temperature, said container having a pair of integral, substantially coextensive, closely adjacent wall members having wall surface portions, one of said wall members having an integral flange extending in a plane generally at a right angle from an end of said one wall member and in a direction remote from said container, and a generally U-shaped support extending substantially parallel to said plane and welded at each of two portions of the legs thereof, spaced from the ends of said legs, to spaced apart portions of said flange, said flange being spaced from said element a distance sufficient to preserve said element below its activation temperature during a welding of said container to said support, the end portions of said legs extending across the end of the other wall member remote from said container and being bent into contact with the wall surface portion of said other wall member remote from said one wall member thereby further securing said pair of wall members to each other.

4. A getter comprising an elongated flashable getter element, a substantially tubular container around said element and having a longitudinal extent substantially the same as that of said element, the ends of said container being pinched for protecting said element from the ambient temperature, said container having a pair of integral, substantially cotextensive, closely adjacent wall members having wall surface portions, each of said wall members having an integral flange extending in a plane generally at a right angle from adjacent ends of said wall members and in opposite directions remote from said container, and a generally U-shaped support extending substantially parallel to said plane and welded at each of two portions of each leg thereof, spaced from the ends of said legs, to spaced apart portions of said flanges for securing said wall members to each other, said flanges being spaced from said element a distance sufficient to preserve said element below its activation temperature during a welding of said container to said support.

5. A getter comprising an elongated flashable getter element, a substantially tubular container around said element and having a longitudinal extent substantially the same as that of said element, the ends of said container being pinched for protecting said element from the ambient temperature, said container having a pair of integral, substantially coextensive, closely adjacent wall members having wall surface portions, one of said wall members having an integral flange extending in a plane generally at a right angle from an end of said one wall member and in a direction remote from said container, and a generally U-shaped support extending substantially parallel to said plane and welded at each of two portions of the legs thereof, spaced from the ends of said legs, to spaced apart portions of said flange, said flange being spaced from said element a distance sufficient to preserve said element below its activation temperature during a welding of said container to said support, the free end portions of said legs extending fixedly across the other wall member thereby further securing said pair of wall members to each other.

6. A getter structure comprising an elongated flashable getter element, an elongated container having walls totally enclosing said getter element, said walls defining a longitudinally extending seam, said seam comprising two thicknesses of the material of said walls and being in face engaging relation throughout their lengths, and getter flashable means fixing longitudinally spaced portions only of said seam, whereby other portions of said seam are adapted to be opened in response to pressure produced when said getter element is flashed, said seam extending from said container and appreciable distance to strengthen the closure function of said other portions of said seam, and to displace said getter element a sufficient distance from said fixing means to prevent a flashing of said getter element by said fixing means.

References Cited in the file of this patent

UNITED STATES PATENTS

| | | |
|---|---|---|
| 1,150,426 | Hadaway | Aug. 17, 1915 |
| 1,809,565 | Ostrak | June 9, 1931 |
| 2,100,746 | Miller et al. | Nov. 30, 1937 |
| 2,146,374 | King | Feb. 7, 1939 |
| 2,180,714 | McQuade | Nov. 21, 1939 |
| 2,209,870 | Anderson | July 30, 1940 |
| 2,462,813 | Reiner | Feb. 22, 1949 |
| 2,474,335 | Skellett | June 28, 1949 |
| 2,617,956 | Hamvas | Nov. 11, 1952 |
| 2,657,452 | Veenemans et al. | Nov. 3, 1953 |

UNITED STATES PATENT OFFICE

CERTIFICATE OF CORRECTION

Patent No. 2,928,925                                      March 15, 1960

Earle S. Thall et al.

It is hereby certified that error appears in the printed specification of the above numbered patent requiring correction and that the said Letters Patent should read as corrected below.

Column 2, line 66, after "flange" insert -- surface --; line 67, after "tions." insert -- Each leg may have two portions welded to the flange portions. --; column 3, line 58, for "at" read -- a --.

Signed and sealed this 1st day of November 1960.

(SEAL)
Attest:

KARL H. AXLINE
Attesting Officer

ROBERT C. WATSON
Commissioner of Patents